United States Patent Office 2,868,995
Patented Jan. 13, 1959

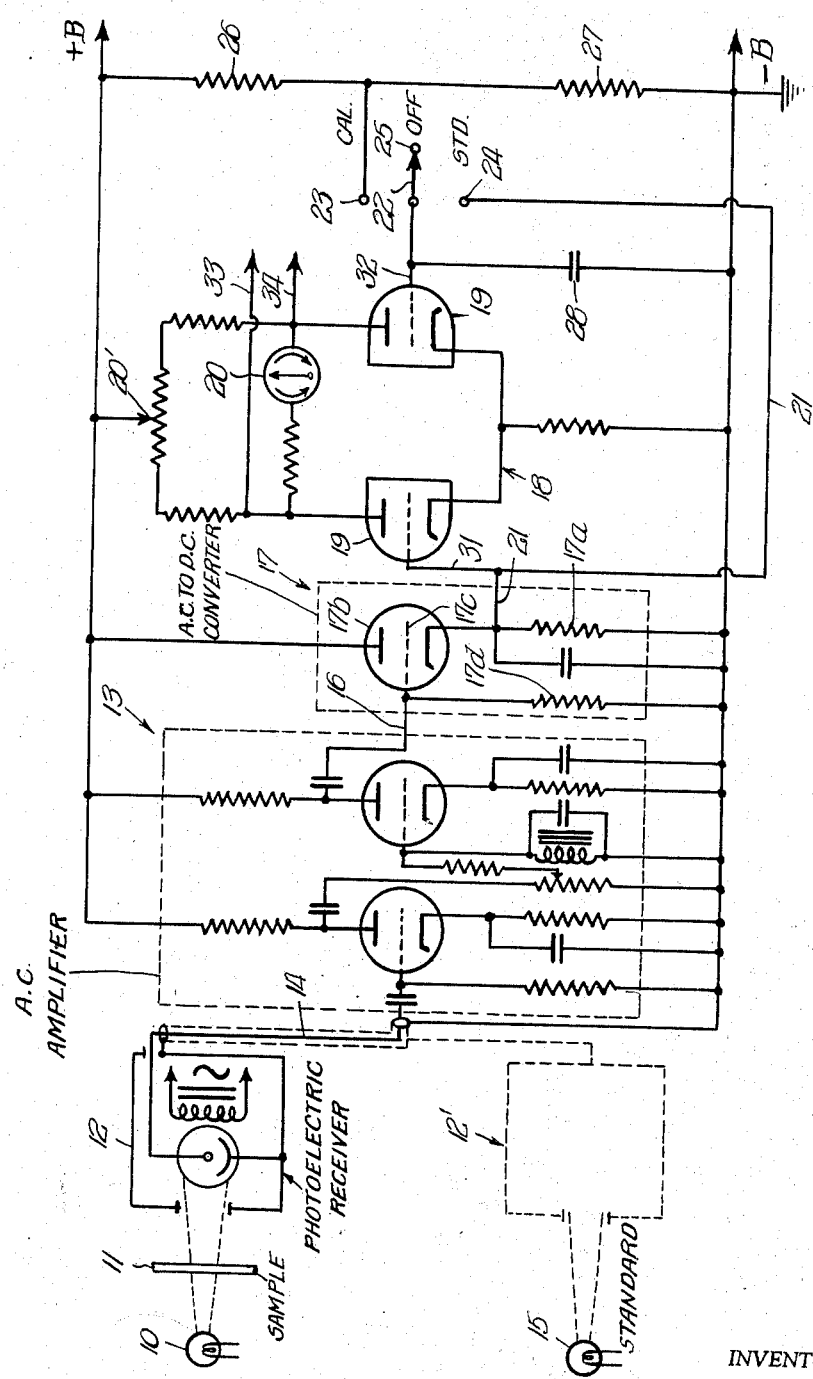

2,868,995

NULL INDICATING PHOTOMETER

Lawrence C. Kelsey, Chicago, and Stanton H. Petry, Arlington Heights, Ill., assignors to W. M. Welch Manufacturing Company, Chicago, Ill., a corporation of Illinois Application May 20, 1955, Serial No. 509,775

6 Claims. (Cl. 250—210)

The present invention relates to an improved photometer capable of readily measuring very small differences between a known or standard source of light emissivity and an incoming, detected light signal which is of unknown or undeterminate intensity, or which is of a variable nature. To this end, the photometer incorporates an internal standard which can be adjusted to equal any desired equivalent external light signal together with an indicating type of amplifier system which indicates deviations in a plus or minus direction from the value of this internal standard, or which indicates a state of balance when an incoming light signal agrees with such standard. Moreover, the improved method performed by the system is such that a signal, proportionate to deviations between incoming signal and standard as shown at the amplifier, may be applied as a control in regulating an incoming variable signal factor so as to bring the same back into agreement with the known standard light factor.

The invention adapts the principle of comparing known standard and incoming, variable light manifestations to many advantageous applications. Among these are the control of photographic printing equipment in the reproduction of color positive materials, the indication of deviations of ink film density in graphic arts printing, the detection and measurement of small differences in density of of light transmissive films, a similar detection and measurement of light reflectivity where the difference between a standard and signal intensities is only slight, and the measurement and indication of paper "brightness" or reflectivity, as in the paper pulp industry. Other advantageous applications will become evident to those skilled in the art.

Many systems have been proposed involving the comparison of an unknown with a standard factor in detection and measuring operations of the character referred to in the previous paragraph. However, all are either comparatively complex or less stable than the improvement of the present invention. One such system obtains comparison of a standard as against a known or variable by the use of a light beam which alternately plays upon the standard and the variable. The two signals are being fed into a meter circuit for comparison, and resultant indication on a meter of the difference between the two. Methods of this type are employed, for example, in spectrophotometers and result in a very complex and expensive instrument.

Another mode of accomplishing the same purpose is to employ two distinct phototubes and related circuit provisions, which feed into a common amplifier in which the desired comparison and measurement of differences in light signals are made. This arrangement lacks stability, since the phototubes in themselves are not entirely stable and their drift characteristics are random in nature. Accordingly, unless the phototubes are very carefully checked and paired it is probable that changes in their individual sensitivity will result in changes and unreliability in the compared measurement.

It is therefore a primary object of the invention to provide an improved method and system which avoid the above disadvantages, being of lessened complexity and cost of production, yet providing accurate and reliable comparison of standard and variable signals, with correspondingly accurate and reliable indications of a different signal which represents proportionately the deviation between the incoming, unknown signal and a selected reference, standard or norm.

Considered structurally, this invention involves the use of a single phototube and an internal standard which, upon installation or initial operation is calibrated predeterminedly in reference to the said signal phototube. This eliminates phototube drift, except for a very small drift and leakage in the amplifier which may exist between standardizing operations. However, inasmuch as time lag between standardization and measurement is of the order of one minute in practically every operation for which the instrument is intended, practically no visible drift is evident within this one minute period.

According to this invention the D. C. output of a sensing device, such as a photomultiplier tube, a strain gage or like device providing proportional electric signals, may be employed. Provision is made to expose alternately the sensing device to the incoming variable signal and to the internal standard. In such an arrangement the resultant D. C. potential is amplified in a D. C. amplifier whose output is passed directly to a vacuum tube bridge circuit.

In the embodiment of this invention as disclosed hereinafter provision is made to expose the phototube alternately to the incoming, variable signal and the internal standard, while modulating the resultant phototube current by the application of an alternating electromagnetic field in proximity to the phototube. The resultant A. C. potential is amplified in an alternating current amplifier, whose output is then passed to a stage adapted to convert the A. C. signal to a proportionate D. C. output signal.

The converted signal is applied to a vacuum tube bridge under the control of a switching device, both sides of which may be connected to the same potential to balance the bridge in a standardizing position of the switch. When the latter is actuated to a center-off position, the charge which has accumulated in the meantime in a capacitor associated with the input to one half of the bridge will remain on the capacitor for a sufficient period of time, until the photoelectric receiver or detector has been exposed to the incoming signal, the illumination of which may be higher or lower than that of the standard. The resultant phototube output voltage is amplified and compared with the stored standard voltage, resulting in a difference or equivalence in value which will either indicate the degree of unbalance, in one direction or another, or, in the case of voltage equivalence will indicate the lack of need for any adjustment.

An important feature of the invention is that the indication derived from the unbalance of value between the incoming and standard signals may either be shown at a meter associated with the vacuum tube bridge of the system, or the output of the bridge may be employed as automatic control to regulate properly the intensity of the incoming signal, as in the case of a projection printing lamp used in color photography.

The foregoing statements are indicative in a general way of the nature of the invention. Other and more specific objects will be apparent to those skilled in the art upon a full understanding of the construction and operation of the method and device.

A single embodiment of the invention is presented herein for purpose of illustration. It will be appreciated that the invention may be incorporated in other modified forms coming equally within the scope of the appended claims.

In the drawing:

The single figure is a schematic circuit diagram of the improved photometer in accordance with the invention.

The reference numeral 10 designates the source of origin of an external light signal, shown as an incandescent lamp, which signal may be assumed to pass through or to be reflected from a sample 11 being evaluated or measured. Member 11 may take the form of a photographic negative, a vial or container of a specimen which is to be assessed in reference to light transmissivity, a paper sheet to be judged as to "brightness" by reflected light, etc. A steady D. C. voltage is caused to flow in a photoelectric receiver unit 12 as the result of impingement of such transmitted or reflected light on the cathode of a phototube component of such receiver, in an entirely conventional fashion.

In view of the fact that it is desirable to amplify the weak incoming photoelectrically detected signal, as well as a so-called reference or standard signal (to be described), in an alternating current type of amplifier, the receiver 12 is preferably of an electromagnetically modulated vacuum type. Such a unit is illustrated and described in a patent to Kalmus No. 2,424,933 of July 29, 1947, and Kalmus et al. No. 2,605,428 of July 29, 1952. A circuit of this sort converts a steady state radiant flux originated in the phototube of unit 12 into an A. C. potential which can be effectively amplified by an A. C. amplifier 13 of conventional character, on which the output of unit 12 is imposed through a lead 14.

The reference numeral 15 designates a standard source of illumination as embodied in the device or system of the invention, which is calibrated upon installation or upon initial operation in a predetermined relationship to the illumination transmitted through or reflected from the sample or specimen 11. The radiant flux of the source 15 is applied to photoelectric receiver 12 in any manner suitable to the particular application, as by the use of a prism, by a beam splitter, etc. For illustrative purposes there is shown at 12′ a broken line outline of a receiver unit which corresponds to or is the receiver 12. It is shown separately for simplicity. It may, if desired, be timed automatically to energize receiver unit 12 in recurrent or alternating relation to the impingement on the latter of the incoming, variable or unknown beam from sample 11. This may be done in a known way by the use of a shutter or like timing device. Alternatively, manual switching of sources 10, 15 may be employed on the understanding that, whether manual or automatic, the control of the sources 10, 15 is synchronized with the operation of a switching unit of the system, to be hereinafter described.

Regardless of whether the output of photoelectric receiver 12 derives from energization by source 10 or source 15, it is electromagnetically modulated in the fashion described and is amplified in amplifier 13, which is a standard type.

The output of amplifier 13 is applied, as conventionally indicated by a lead 16, to a converter stage 17, which is capable of converting its alternating current input to a direct current output bearing a linear, strictly proportionate relationship thereto. In the interest of maintaining a high signal-noise ratio, amplifier 13 should have peaked response at a frequency twice the frequency of magnetic modulation in receiver 12; it should also contain suitable attenuators to set the signal level. In these respects the amplifier 13 is entirely conventional and its particular design is quite incidental in the operation of the improved system as a whole.

As stated, converter 17 produces a direct current output signal which is strictly proportional to its incoming A. C. signal from amplifier 13. Various hookups, of which a cathode follower stage is an example, will serve this purpose, and since only the factor of linearity of response is controlling such a converter is depicted. Assuming a cathode follower is employed, there is a D. C. potential across a cathode resistor 17a which is dependent on the gain of the tube 17b when its grid 17c is converted to ground potential through a resistor 17d, and on the supply voltage. The D. C. output is then this steady value plus the peak to peak signal voltage (when the cathode resistor is by-passed) appearing across the cathode.

The reference numeral 18 generally designates a conventional vacuum tube bridge network such as has common usage in vacuum tube voltmeters and will be familiar to those skilled in the art. The wiring of the double triodes 19 of this network to its meter 20, and in reference to its voltage supply through a tapped resistor 20′ is conventional. Leads 21 connect the output of converter stage 17 with input terminals 31 and 32 and thereby to the triode grids. One half of bridge 18 is connected through a switch 22 adapted to make contact with calibration ("CAL"), standardizing ("STD") and center "off" terminals 23, 24, 25, respectively.

This is a center-off, single pole-double throw switch and in the top, calibration position with its contactor in engagement with terminal 23 the switch simply connects one half of the bridge circuit with a stable reference potential for the purpose of setting a mean reference level in initial calibrating. Resistors 26, 27 are components of a voltage divider network selected to give a desired calibration potential. In a bottom, standardizing position both sides of the bridge are connected through terminal 24 to the same potential and the bridge can be balanced, as at tap 20′. Potential appearing at terminal 24 is stored in a grounded capacitor 28, connected to a grid of a triode 19, and in the center, "off" position of the switch, will remain in capacitor 28 for a considerable period of time, i. e. while photoelectric receiver unit 12 is caused to collect illumination from the incoming signal light source 10, 11.

This illumination may be higher or lower than that emanating from standard 15; if so the meter 20 of bridge network 18, or the output voltage of the network applied across conductors 33 and 34, will reflect the degree and direction, plus or minus, of the unbalance. If the signals derived by unit 12 from the incoming source and standard sources are equal, no indication will be made by the meter and no output voltage will flow in the network 18.

Either manual or automatic means can be used to bring the source 10 to a point of equality, in regard to its radiant flux, with the standard source 15. For example, a calibrated separate means can be used to determine the amount of difference potential required to equate the signal and standard potential, and also to apply such difference potential in the event adjustment or control is to be automatically effected. Details of such indicating and automatic balancing means form no part of the present invention.

As pointed out the impingement of the beam of standard source 15 on photoelectric receiver unit 12, by one means or another, is to be coordinated with the engagement of switch 22 and contact 24, manually or through appropriate mechanical linking device, to the end that the standard potential at terminal 24 is stored in capacitor 28 adequately for application to bridge network 18 during the subsequent phase of energization of receiver 12 by source 10. After the capacitor 28 is charged on shifting of the switch 22 to engage terminal 24, the switch 22 is returned to the "off" position, leaving the charge on capacitor 28. Now when the signal voltage is applied, the switch 22 being in the "off" position, the signal voltage is effective only on input terminal 31 and the grid of the associate triode 19. Depending on whether the voltage applied to this grid is above or below the voltage applied to the grid of the other triode 19 by the capacitor 28, the voltage applied between conductors 33 and 34 and across meter 20 will be of one polarity or the other or, if the voltages are equal, no voltage will be applied between conductors 33 and 34 or across meter 20.

The system, in employing but a single photoelectric receiver in common with dual external signal and standard energizers, has the great advantage of simplicity, compactness and low cost, without operational factors leading to unreliable operation as found in existing systems of like general type.

As pointed out hereinbefore the amplified D. C. output of a sensing device can be applied directly to the bridge network 18. In such case it would be unnecessary to employ the converter stage 17 and the amplifier 13 would be a D. C. amplifier.

We claim:

1. A photometric system to indicate variations in external received light from a desired standard light value comprising, an external light source to emit a beam of variable value, a standard light source to emit a beam of standard value, a photoelectric receiver unit arranged to be photoelectrically energized, in common and non-currently, by said external light and by said standard light, thereby to originate respective signal and standard voltages, an amplifier having a grounded terminal and supplied by said receiver unit and adapted to provide unidirectional voltages the magnitude of which are functions respectively of the voltages applied by said receiver unit, and a bridge device having grid controlled electric valves in adjacent legs, circuit means commonly connecting the grids of said electric valves to said amplifier including a switch for disconnecting one grid from said amplifier, and a capacitor connected between said one grid and ground, which switch in closed position connects said one grid to said amplifier for charging said capacitor and in the open position disconnects said one grid from said amplifier whereby the voltage applied to said one grid is determined by the charge on said capacitor.

2. A photometric system to indicate variations in external received light from a desired standard light value comprising, an external light source to emit a beam of variable value, a standard light source to emit a beam of standard value, a photoelectric receiver unit arranged to be photoelectrically energized, in common and non-concurrently, by said external light and by said standard light, thereby to originate respective signal and standard electric currents, means acting on said receiver unit to modulate said currents and produce signal and standard output alternating voltages, an alternating current amplifier having a grounded terminal and supplied by said receiver unit and adapted to provide unidirectional voltages the magnitude of which are functions respectively of the currents applied by said receiver unit, and a bridge device having grid controlled electric valves in adjacent legs, circuit means commonly connecting the grids of said electric valves to said amplifier including a switch for disconnecting one grid from said amplifier, and a capacitor connected between said one grid and ground, which switch in closed position connects said one grid to said amplifier for charging said capacitor and in the open position disconnects said one grid from said amplifier whereby the voltage applied to said one grid is determined by the charge on said capacitor.

3. A photometric system to indicate variations in external received light from a desired standard light value comprising, an external light source to emit a beam of variable value, a standard light source to emit a beam of standard value, a photoelectric receiver unit arranged to be photoelectrically energized, in common and non-concurrently, by said external light and by said standard light, thereby to originate respective signal and standard electric currents, means acting on said receiver unit to modulate said currents and produce signal and standard output alternating voltages, an alternating current amplifier having a supply connection to said unit, a converter unit having a grounded terminal and supplied by said amplifier and converting its respective amplified alternating output voltages to unidirectional output voltages, and a bridge device having grid controlled electric values in adjacent legs, circuit means commonly connecting the grids of said electric valves to said converter unit including a switch for disconnecting one grid from said amplifier, and a capacitor connected between said one grid and ground, which switch in closed position connects said one grid to said converter unit for charging said capacitor and in the open position disconnects said one grid from said converter unit whereby the voltage applied to said one grid is determined by the charge on said capacitor.

4. A photometric system to indicate variations in external received light from a desired standard light value comprising, an external light source to emit a beam of variable value, a standard light source to emit a beam of standard value, a photoelectric receiver unit arranged to be photoelectrically energized, in common and non-concurrently, by said external light and by said standard light, thereby to originate respective signal and standard electric currents, means acting on said receiver unit to modulate said currents and produce signal and standard output alternating voltages, an alternating current amplifier having a supply connection to said unit, a converter unit having a grounded terminal and supplied by said amplifier and converting its respective amplified alternating output voltages to unidirectional output voltages, respectively, which are in linear proportion thereto, and a bridge device having grid controlled electric valves in adjacent legs, circuit means commonly connecting the grids of said electric valves to said converter unit including a switch for disconnecting one grid from said amplifier, and a capacitor connected between said one grid and ground, which switch in closed position connects said one grid to said converter unit for charging said capacitor and in the open position disconnects said one grid from said converter unit whereby the voltage applied to said one grid is determined by the charge on said capacitor.

5. A photometric system to indicate variations in external received light from a desired standard light value comprising, an external light source to emit a beam of variable value, a standard light source to emit a beam of standard value, a photoelectric receiver unit arranged to be photoelectrically energized, in common and non-concurrently, by said external light and by said standard light, thereby to originate respective signal and standard electric currents, means acting on said receiver unit to modulate said currents and produce signal and standard output alternating voltages, an alternating current amplifier having a supply connection to said unit and characterized by a peaked response at twice the modulation frequency of said receiver unit, a converter unit having a grounded terminal and supplied by said amplifier and converting its respective amplified alternating output voltages to unidirectional output voltages, respectively, which are in linear proportion thereto, and a bridge device having grid controlled electric valves in adjacent legs, circuit means commonly connecting the grids of said electric valves to said converter unit including a switch for disconnecting one grid from said amplifier, and a capacitor connected between said one grid and ground, which switch in closed position connects said one grid to said converter unit for charging said capacitor and in the open position disconnects said one grid from said converter unit whereby the voltage applied to said one grid is determined by the charge on said capacitor.

6. A photometric system to indicate variations in external received light from a desired standard light value comprising, an external light source to emit a beam of variable value, a standard light source to emit a beam of standard value, a photoelectric receiver unit arranged to be photoelectrically energized, in common and non-concurrently, by said external light and by said standard light, thereby to originate respective signal and standard voltages, an amplifier having a grounded terminal and supplied by said receiver unit and adapted to provide unidirectional voltages the magnitude of which are functions respectively of the voltages applied by said receiver unit, a bridge device having the grid controlled electric valves in adjacent legs, circuit means commonly connecting the grids of said electric valves to said amplifier including a switch for disconnecting one grid from said amplifier, and a capacitor connected between said one grid and ground for retaining after said switch is opened a standardizing charge derived from said standard light source while said switch is closed.

References Cited in the file of this patent
UNITED STATES PATENTS

| | | |
|---|---|---|
| 2,424,933 | Kalmus | July 29, 1947 |
| 2,605,428 | Kalmus et al. | July 29, 1952 |

UNITED STATES PATENT OFFICE
CERTIFICATE OF CORRECTION

Patent No. 2,868,995                            January 13, 1959

Lawrence C. Kelsey et al.

It is hereby certified that error appears in the printed specification of the above numbered patent requiring correction and that the said Letters Patent should read as corrected below.

Column 1, line 41, strike out "of", first occurrence; column 6, line 2, for "values" read -- valves --.

Signed and sealed this 21st day of July 1959.

(SEAL)
Attest:

KARL H. AXLINE
Attesting Officer

ROBERT C. WATSON
Commissioner of Patents